June 13, 1944.  A. RICKARD  2,351,289
TUBULAR STEERING WHEEL OR THE LIKE AND PROCESS OF MAKING SAME
Filed Oct. 29, 1942   2 Sheets-Sheet 1

Inventor
Arthur Rickard.

June 13, 1944. A. RICKARD 2,351,289
TUBULAR STEERING WHEEL OR THE LIKE AND PROCESS OF MAKING SAME
Filed Oct. 29, 1942 2 Sheets-Sheet 2
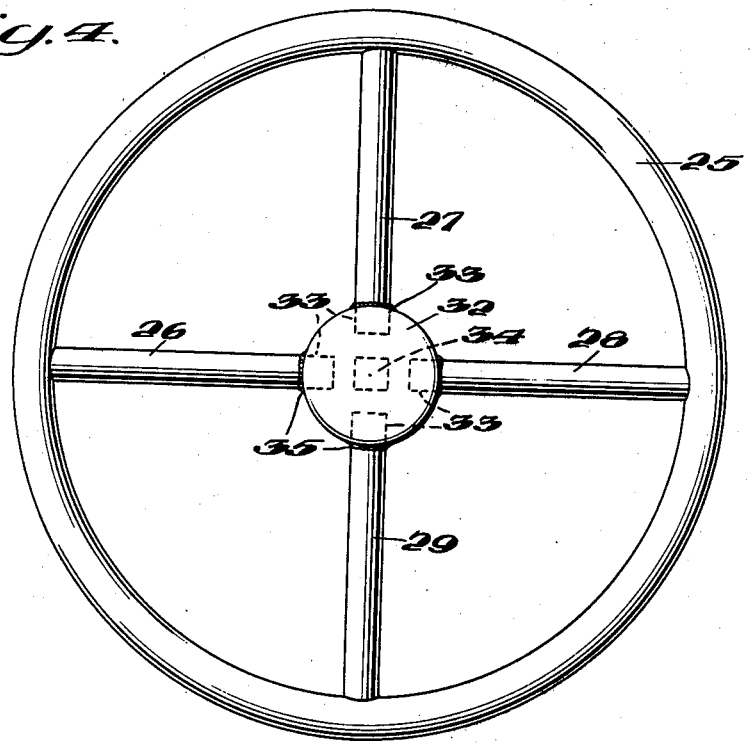
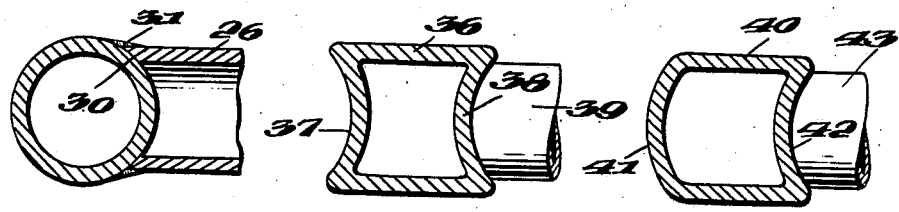
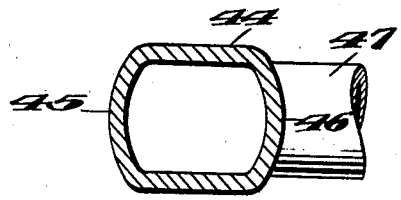
Arthur Rickard Inventor
By
Attorney Patented June 13, 1944

2,351,289

UNITED STATES PATENT OFFICE 2,351,289

TUBULAR STEERING WHEEL OR THE LIKE AND PROCESS OF MAKING SAME

Arthur Rickard, Dallas, Tex., assignor to Universal Building Products Corp., Dallas, Tex.

Application October 29, 1942, Serial No. 463,806

8 Claims. (Cl. 29—159)

This invention relates to a new article of manufacture comprising a steering wheel of tubular construction, preferably of rail carbon steel, and the process of making such a steering wheel.

An object of the invention is to provide a strong, rugged ferrous metal steering wheel of tubular construction suitable for use on vessels, and which may take the place of the bronze or aluminum steering wheels heretofore used in the marine wheel field.

Another object is to construct a steering wheel of rail carbon steel whereby sheets are rolled or otherwise formed from discarded rails, and tubes are constructed from the sheets, the wheel being afterwards fabricated from the tubes.

Other objects will appear hereinafter throughout the specification, reference being had to the accompanying drawings.

In the drawings:

Figure 4 is a top plan view of another form of the invention;

Figure 5 is a section of a tubular rim and a portion of the spoke which is welded thereto, of the wheel shown in Figures 1 and 4;

Figure 6 is a cross section of another form of rim and of one of the spokes in partial view;

Figure 7 is a view similar to Figure 6, showing still another form, and

Figure 8 is a view similar to Figures 6 and 7, but showing yet another form of the invention.

Steering gear heretofore used in small vessels has been of very staunch construction and steering wheels of such gear have usually been made of solid piece construction by casting copper alloys, aluminum, and other metals to form a completed wheel during each casting operation.

The scarcity of copper and aluminum at the present time, and the demand for a large number of wheels of the type described, has required that new wheels be made of some material, not as critical as copper and preferably of used metals, termed "scrap" metals. It is possible to construct marine steering wheels in large numbers by the present invention, and to utilize such "scrap" metals as rail carbon, this material being available in the form of abandoned street car tracks. Reused rail carbon is at present time available in quantities in almost all sections of this country. Such high carbon steels may be quickly converted to war use by the following method:

The rails are cold or hot rolled by a steel rolling mill into sheets of proper thickness.

The sheets are cut to the required sizes to form the rim and spoke portions of the wheel.

The cut sections are made into tubes by any suitable method, including winding or rolling the sheets to form the tubes.

The rim portion is formed such as by winding the tube about a mandrel, preferably while in heated condition.

The spoke ends are cut or otherwise brought to proper shape for joining with the rim and with each other.

Figure 2:
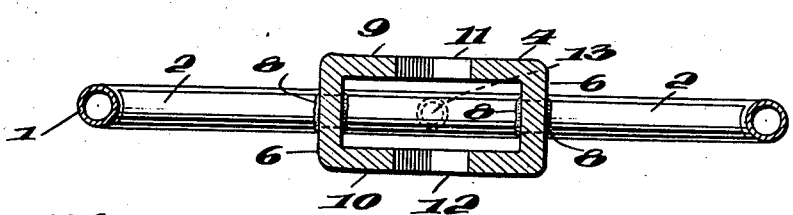
Figure 2 is a sectional view taken on the line 2—2 of Figure 1.

The center or box-shaped head is formed by a sheet of somewhat heavier metal into oblong shape in vertical cross-section, as shown in Figure 2.

After providing apertures in the sides of the head at spaced intervals, the spokes are preferably welded to the rim, in the holes of the head and to each other.

Figure 1:
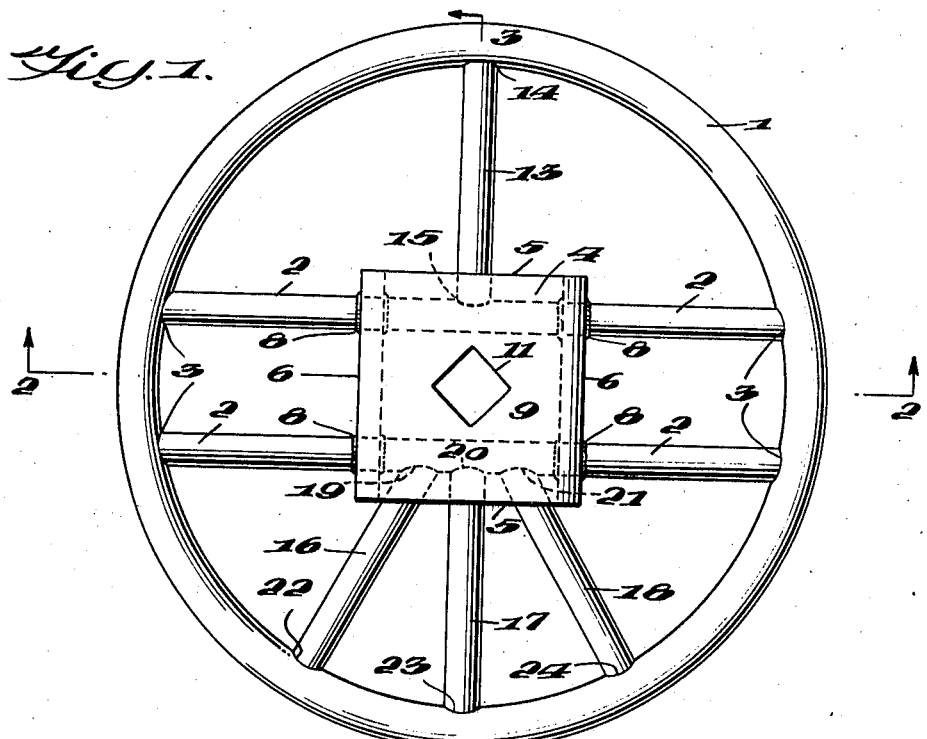
Figure 1 is a top plan view of a steering wheel constructed in accordance with the present invention.
Figure 3:
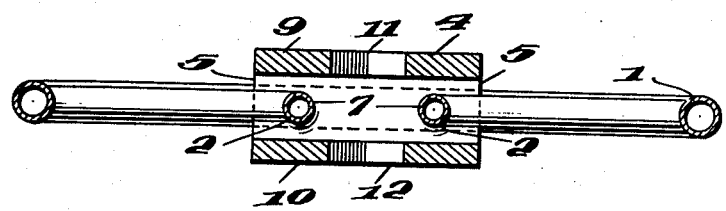
Figure 3 is a sectional view taken on the line 3—3 of Figure 1.

In Figures 1 to 3, the numeral 1 indicates the wheel rim which has been made from a sheet of rail carbon steel into a tube having its ends butt-welded and its sides welded together to form the completed tube. The long spokes 2 which give to the completed wheel its principal strengthening qualities are attached at their ends 3 to the wheel rim. The box-like head which is made from heavier gage metal than the spokes, is shown at 4. It is in the shape of a box having two open sides indicated at 5 and the abutting ends of the box may be welded together.

The closed sides 6 of the box are provided with a number of spaced holes 7 for the reception of the long spokes 2 which after being threaded through said holes, are welded in place, the welds being indicated by the numeral 8. The top web 9 and bottom web 10 of the box-shaped head are each provided, respectively, with square or irregularly shaped apertures 11 and 12, for the reception of the steering post, not shown.

There is at least one short spoke 13 which extends into one of the open ends of the box 4 and is welded at its opposite ends 14 and 15 to the wheel rim 1, and one of the long spokes 2. A series of radially extending spokes 16, 17 and 18 having inner ends 19, 20 and 21, extend into the other box open end, and are welded to the other long spoke 2. The outer ends 22, 23 and 24 are welded to the wheel rim.

The resulting wheel is actually stronger than the old cast wheel, and is entirely practicable in use, as it may be protected by a coating of paint or otherwise protected.

The wheel shown in Figures 4 and 5 is provided with a rim 25 and a series of spokes 26, 27, 28 and 29, which are attached to the rim by diagonally cutting the ends of the tubes comprising the spokes, as indicated at 30, so as to closely fit the rim, and are welded at 31 to the said rim.

Each of the ends of the spokes shown in Figure 1 may be shaped and welded to the rim 1 and to each other, as shown in the detail view Figure 5.

The numeral 32 indicates the center head which is formed of a single piece of metal, and is provided with a series of sockets 33 into which the ends of the spokes may be inserted and welded, as indicated at 35. The center of the head 32 may be provided with a square recess indicated at 34 in dotted lines for the reception of the steering post.

In Figure 6 the wheel rim 36 has been specially shaped so as to provide concave sides 37 and 38, to which latter the spokes 39 are welded. The construction is practically incapable of distortion under pressure. Such shape permits the use of thinner gage metal as may be also permitted in constructions illustrated in Figures 7 and 8.

In Figure 7 the rim 40 has an outer convex portion 41 and an inner concave portion 42 to which the spokes 43 may be welded, as described with reference to previous figures.

Figure 8 shows a rim 44 having a convex outer portion 45 and a convex inner portion 46 to which the spokes 47 are welded.

The round tubes, such as shown in Figure 5 may be cold or hot rolled, or otherwise treated to obtain the shapes illustrated in Figures 6, 7 and 8, the particular forming method not being a part of the present invention.

It will be noted that the several forms of the invention shown illustrate means whereby cheap ferrous metal of the kind termed "scrap" metal may be quickly turned into a very useful piece of equipment without extensive treatment, and that the steering wheels so formed are entirely suitable for the use intended.

It is to be understood that the wheels described above may be used for other purposes, such as brake wheels for freight cars, and farm equipment, and that the description is to be construed in an illustrative and not a limiting sense.

What I claim is:

1. In a method of making steering wheels comprising the steps of forming a plurality of hollow tubes of different lengths from sheets of high carbon steel, forming a wheel rim from one of said tubes and spokes of different lengths from others of said hollow tubes, forming a box-shaped head from another of said steel sheets, providing aligned apertures in said head, threading said longer spokes through said apertures, welding intermediate portions of said spokes in said apertures, and welding the ends of said spokes to said wheel rim, and welding a plurality of smaller spokes at their respective ends to said wheel rim and to the portions of said longer spokes located between said aligned apertures of said box-like head.

2. A steering wheel comprising a circular hollow wheel rim, a plurality of long spokes extending substantially diametrically across said wheel rim, a hollow box-shaped head formed of sheet metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes.

3. A steering wheel comprising a circular hollow wheel rim, a plurality of long spokes extending substantially diametrically across said wheel rim, a hollow box-shaped head having open sides formed of wheel metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes.

4. A steering wheel comprising a circular hollow wheel rim, a plurality of long spokes extending substantially diametrically across said wheel rim, a hollow box-shaped head formed of sheet metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes, said short spokes extending within the open sides of said head.

5. A steering wheel comprising a circular hollow wheel rim, a plurality of long spokes extending substantially diametrically across said wheel rim, a hollow box-shaped head having open sides formed of sheet metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes, said short spokes extending within the open sides of said head.

6. A steering wheel comprising a circular hollow wheel rim, a plurality of long spokes extending substantially diametrically across said wheel rim, a hollow box-shaped head formed of sheet metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes, said hollow wheel rim being substantially square in cross section with flat top and bottom portions, but having sides which are curved.

7. A steering wheel comprising a circular hollow wheel rim, a plurality of long spokes extending substantially diametrically across said wheel rim, a hollow box-shaped head formed of sheet metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes, said hollow wheel rim being substantially square in cross section but having a convex outer side and a concave inner side.

8. A steering wheel comprising a circular hollow wheel rim, a plurality of long spokes extending substantially diametrically across said wheel rim, a hollow box-shaped head formed of sheet metal and located centrally within said wheel rim, said head having a plurality of vertical walls with aligned apertures through which extend said long spokes, a plurality of shorter spokes extending within said box-shaped head, said shorter spokes being welded to said wheel rim and to at least one of said long spokes, said hollow wheel rim being substantially square in cross section with a flat top and bottom portions and convex side portions.

ARTHUR RICKARD.